United States Patent [19]

Harms

[11] Patent Number: 4,919,827

[45] Date of Patent: Apr. 24, 1990

[54] MULTICOMPONENT ORGANIC LIQUID AND USE THEREOF IN TREATING WELLS AND SUBTERRANEAN FORMATIONS

[75] Inventor: Susan D. Harms, Houston, Tex.

[73] Assignee: Amoco Corporation, Chicago, Ill.

[21] Appl. No.: 187,637

[22] Filed: May 5, 1988

[51] Int. Cl.$^5$ .............................................. E21B 43/27
[52] U.S. Cl. .............................. 252/8.553; 252/8.552; 166/307
[58] Field of Search .......................... 252/8.552, 8.553; 166/307

[56] References Cited

U.S. PATENT DOCUMENTS

| | | | |
|---|---|---|---|
| 2,024,718 | 12/1935 | Chamberlain | 252/8.553 |
| 2,356,205 | 8/1944 | Blair et al. | 252/8.552 |
| 3,402,770 | 9/1968 | Messenger | 252/8.552 X |
| 3,548,945 | 12/1970 | Gidley | 166/307 |
| 3,819,520 | 6/1974 | Jones et al. | 252/8.553 |
| 3,902,557 | 9/1975 | Shaughnessy et al. | 166/295 |
| 4,601,836 | 7/1986 | Jones | 252/8.553 |
| 4,738,789 | 4/1988 | Jones | 252/8.553 |

*Primary Examiner*—John F. Terapane
*Assistant Examiner*—Gary L. Geist

[57] ABSTRACT

A multicomponent liquid useful in treating wells or subterranean formations comprising ethylene glycol monobutyl ether and octyl alcohol. Also disclosed are clear aqueous acidic solutions of said liquid and the use thereof in treating wells or subterranean formations.

25 Claims, No Drawings

MULTICOMPONENT ORGANIC LIQUID AND USE THEREOF IN TREATING WELLS AND SUBTERRANEAN FORMATIONS

FIELD OF THE INVENTION

This invention relates to a process and composition for treating oil and gas wells and/or subsurface formations surrounding oil, gas, or injection wells.

BACKGROUND OF THE INVENTION

It has often been noted that the output of oil or gas wells falls off more rapidly than one would attribute to reserve depletion. In other cases, wells drilled into known producing formations are found to have a production rate much below that which would be predicted from the information known about the reservoir.

Various treatments of such wells and the surrounding formation have been employed to improve hydrocarbon recovery. Commonly employed processes involve the injection of aqueous acidic solutions into the formation to dissolve portions of the formation and thus increase the permeability of the formation. Examples of such acidic aqueous solutions include aqueous solutions of hydrochloric acid, hydrofluoric acid, or mixtures of hydrochloric and hydrofluoric acid.

Another approach that has been employed in the past has involved the injection into the formation of an organic liquid having at least some solubility for both oil and water either alone or in combination with aqueous acid. Some typical examples of such techniques are disclosed in U.S. Pat. No. 2,356,205 (Blair, et al.); U.S. Pat. No. 3,402,770 (Messenger); U.S. Pat. No. 3,548,945 (Gidley); U.S. Pat. No. 3,819,520 (Jones, et al.); and U.S. Pat. No. 3,915,233 (Slusser), the disclosures of which are incorporated herein by reference.

In general it is desirable for the organic liquid well treating agent to be a material having miscibility with both active and spent aqueous acid, the ability to reduce surface and interfacial tension, and the ability to dissolve organic deposits. Also generally it is desirable for the organic liquids to be materials which will promote water wetting of sand without promoting agglomeration of the sand. Still further it is often desirable for the organic liquid to be a material which will not promote the formation or stabilization of oil and water emulsions. Other characteristics that are often of importance are the flash point and the tendency of the material to cause corrosion of metal.

One of the organic well treating agents that has often been used in the past is ethylene glycol monobutyl ether (hereinafter referred to as EGMBE). The EGMBE was found to be especially useful in lowering the surface tension of aqueous solutions and in lowering the interfacial tension between oil and water. One of the drawbacks of EGMBE has been the fact that at higher concentration it often does not form a truly miscible solution in aqueous acid. For example, U.S. Pat. No. 3,819,520 in column 2, lines 30–38 discloses that at concentrations above 10 percent EGMBE frequently does not form a clear stable solution in aqueous acid.

U.S. Pat. No. 3,819,520 also discloses that one can get clear stable acidic aqueous solutions which provide a remarkable reduction in surface tension by employing a combination of isopropyl alcohol and an octyl alcohol. The octyl alcohols alone have very low water solubility. However surprisingly, as taught by U.S. Pat. No. 3,819,520, clear stable single phase aqueous acidic solutions can be formed if octyl alcohol is employed in conjunction with a sufficient amount of a lower alcohol such as isopropyl alcohol.

An object of the present invention is to provide a multicomponent organic liquid which has advantages over either EGMBE or the octyl alcohol/lower alcohol mixture of U.S. Pat. No. 3,819,520. Still other objects, advantages, and benefits of the present invention will be apparent from the following description.

SUMMARY OF THE INVENTION

In accordance with the present invention there is provided an organic liquid useful for treating wells or subterranean formations. The organic liquid comprises EGMBE and octyl alcohol in proportions which allow the formation of a substantially clear solution with aqueous acid. The invention further provides a method for promoting hydrocarbon recovery from a subterranean hydrocarbon bearing formation involving introducing said organic liquid mixture into the well and/or formation.

DETAILED DESCRIPTION

The EGMBE and the octyl alcohol can be combined in any suitable amounts to give the multicomponent organic liquid; however, generally it is preferable for the EGMBE to amount to about 65 to about 88 percent by weight of the multicomponent liquid and for the octyl alcohol to amount to about 5 to about 20 weight percent of the multicomponent liquid. An often even more preferred range is from about 70 to about 88 weight percent for the EGMBE and about 9 to about 16 weight percent for the octyl alcohol.

The term octyl alcohol or octanol as used herein refers to alcohols of the formula ROH in which R is a saturated or unsaturated aliphatic or alicyclic group having 8 carbon atoms. As will be seen in the discussion which follows, other alcohols can be also be present in the multicomponent organic liquid. Preferably, however, the multicomponent organic liquid is substantially free of alcohols having more than about 10 carbon atoms in R of the formula ROH. It is believed those higher alcohols can lead to surfactant effects that can cause or stabilize oil/water emulsions. One of the advantages of the present inventive multicomponent liquid is that it can be effective in the absence of any substantial amount of surfactant.

Examples of octanols include the $C_8$ alcohols often currently referred to in the trade as capryl alcohol as well as the mixture commercially available under the tradename "Isooctyl Alcohol." The "Isooctyl Alcohol" is believed to be a mixture of alcohols which are almost entirely octanols, nearly all of which have branched R groups. Another source of octanol which has been found useful is a mixture of $C_6$–$C_{10}$ alcohols sold by Vista Chemical under the tradename Alfol 810. Alfol 810 has been indicated to contain no more than about 1 weight percent of $C_6$ or lower alcohols and less than about 1 weight percent of $C_{12}$ or higher alcohols. The $C_8$ alcohols in Alfol 810 have been indicated as accounting for about 39 to about 47 weight percent and the $C_{10}$ alcohols about 51 to about 59 weight percent based on the weight of the total mixture.

It is also within the scope of the present invention to include other organic liquids in the multicomponent organic liquid. Examples include alcohols having less than 8 carbon atoms per molecule and organic solvents for paraffins and asphaltenes. Some typical examples of organic solvents for paraffins and asphaltenes include normally liquid aromatic compounds such as benzene, toluene, and xylene or alkylated naptha dissolved in kerosene. One particularly preferred alcohol for use in combination with octanol is isopropyl alcohol.

The amounts of lower alcohol or organic solvent can vary widely depending upon the overall results desired. In the currently preferred embodiments isopropyl alcohol is used in an amount no greater than about 10 weight percent of the multicomponent liquid and xylene is employed in an amount no greater than about 20 weight percent. Typically, the amount of isopropyl alcohol is kept at a level which will assure that the multicomponent liquid will have a flash point of at least 90° F., still more preferably at least about 100° F. The flash point can readily be determined using the standard procedures used with a SetaFlash Tester.

The solution of acid to which the inventive multicomponent organic liquid is added may be almost any of the aqueous solutions of water-soluble acids commonly employed for acidizing formations. Such solutions include aqueous solutions of hydrochloric acid, formic acid, acetic acid, hydrofluoric acid, mud acid, or the like. Preferably nitric acid should not be used because of its strong oxidizing effect on the alcohol. Any of the water-soluble, nonoxidizing acids ordinarily used in well acidization can be used. The aqueous acid solutions would generally contain about 5 to about 30 percent by weight of the acid. For aqueous HCl the 15 weight percent aqueous hydrochloric acid generally used in well acidizing is generally preferred.

The amount of the inventive multipurpose organic liquid that is combined with the aqueous acid can vary over a wide range depending upon the particular aqueous acid solution employed and the particular inventive multicomponent liquid employed. It is generally desirable to employ the inventive multicomponent liquid in an amount that will form a substantially clear single phase solution with the acid. Typically the upper limit of the amount of aqueous 15 percent HCl in the organic liquid/aqueous acid mixture is in the range of about 50 to about 85 volume percent. Obviously the optimum amounts for a given application can be readily determined by empirically determining the relative amounts of acid and the relative amounts of the components of the inventive multicomponent liquid which will best dissolve samples of material that are believed to be presenting the problem in the formation.

The organic liquid/aqueous acid mixture can be employed in the same fashion as acidizing solutions have been employed in the past. Thus the mixture can be used to treat oil producing wells or water-injection wells used in the water-flooding type of secondary recovery. In a producing well the mixture is pumped down the well and into the oil-bearing formation surrounding the well and then the well is returned to an oil producing operation. In an injection well the mixture would typically be injected into the oil-bearing formation and then followed by flooding water or other flooding material. The mixture can be applied for removing mineral or organic deposits occurring in gas or gas condensate wells. The mixture can also be used in conjunction with heat or steam soaking operations.

The amount of the organic liquid/acid mixture employed may vary over a wide range as is typical of acidizing processes. The organic liquid/acid mixture is employed in an amount sufficient to dissolve the flow-restricting material. Thus the use could involve from a few hundred barrels to several thousand barrels of the mixture. Generally amounts in the range of about 500 to about 5000 U.S. gallons should provide desirable results. Stated differently, it is within the scope of the invention to use about 10 to about 500 U.S. gallons per ft of treatment zone as recommended in U.S. Pat. No. 3,548,945 for another type of acidizing mixture. Empirical observations on one well in a locale, its flow-restricting material, and the dissolution capacity of the mixture employed afford the best guide as to the amount of the mixture required for treatments in the same general locale.

It is also within the scope of the present invention to include in the organic liquid/acid mixture other additives which do not destroy the essential advantages of the inventive mixture. The most notable example would include the employment of corrosion inhibitors designed to protect the metal tubular goods and equipment from acid attack. It is considered that generally any of the corrosion inhibitors that have been used in the past in acidizing formulations should be suitable. Typical examples include compounds of the type set forth in U.S. Pat. No. 3,077,454.

It is also within the scope of the invention to pump the inventive multipurpose organic liquid into an oil bearing formation separate from aqueous acid. In some cases there are advantages obtained by having an injection of the organic liquid into the formation either after or before the aqueous acid is injected into the formation.

A further understanding of the present invention and its advantages will be provided by the following examples.

EXAMPLE I

A series of tests were conducted to compare the miscibility of various organic liquids with active 15 weight percent aqueous HCl and with synthetic spent acid. The compositions of the various organic liquids tested in this and the following examples are shown in the following table.

TABLE 1

| Organic Liquid | Composition, Percent by Weight | |
|---|---|---|
| A | EGMBE | 70.4 |
|   | Capryl alcohol | 9.6 |
|   | Xylene | 20.0 |
| B | EGMBE | 70.9 |
|   | Capryl alcohol | 14.1 |
|   | Isopropyl alcohol | 5.0 |
|   | Xylene | 10.0 |
| C | EGMBE | 76.0 |
|   | Alfol 810 | 24.0 |
| D | EGMBE | 88.0 |
|   | Capryl alcohol | 12.0 |
| E | EGMBE | 100.0 |
| F | Isopropyl alcohol | 88.6 |
|   | Capryl alcohol | 11.4 |
| G | Methanol | 20.0 |
|   | Capryl alcohol | 9.1 |
|   | Isopropyl alcohol | 50.9 |
|   | Xylene | 20.0 |

The synthetic spent acid was prepared by admixing 198 grams of calcium chloride, 0.5 grams of calcium carbonate, 32 grams of magnesium chloride, and 2 grams of calcium sulfate to 1000 ml of water. The synthetic spent acid thus prepared had a pH of 6 and a specific gravity of 1.113. The miscibility tests were carried out by titrating a known volume of the various organic liquids with the acid. At the point at which acid addition resulted in a permanent haze, the total volume of acid added was recorded. The percent miscibility was determined from the volume of organic liquid/(volume of organic liquid + volume of acid added at last point of solution clarity) times 100%. The miscibility results obtained are summarized in the following table:

TABLE 2

| Organic Liquid | Percent Miscibility Live Acid | Percent Miscibility Spent Acid |
|---|---|---|
| A | 50 | 92 |
| B | 35 | 88 |
| C | 22 | 81 |
| D | 15 | 83 |
| E (EGMBE) | 10 | 71 |
| F | 35 | 84 |
| G | 80 | 82 |

The results show that the inventive organic liquids A and B are more miscible in live acid than comparative liquid G, a commercially available multipurpose organic liquid. While liquid G showed better miscibility in spent acid, inventive liquids A and B have a much higher flash point than liquid G.

Inventive liquids C and D showed better miscibility than comparative liquid F, a commercially available multipurpose organic liquid of the type described in U.S. Pat. No. 3,819,520.

Some physical properties of the inventive organic liquids of Table 1 are shown in the following Table.

TABLE 3

| | Organic Liquid | | | |
|---|---|---|---|---|
| | A | B | C | D |
| Refractive Index | 1.43 | 1.42 | 1.42 | 1.42 |
| Viscosity, cp | 2.25 | 2.1 | 3.45 | 3.0 |
| Specific gravity | 0.87 | 0.85 | 0.86 | 0.87 |
| Density, lb/gal | 7.25 | 7.11 | 7.17 | 7.27 |
| Flash point, °F. | 103.00 | 107.00 | 150.00 | 148.00 |
| Initial Boiling pt, °C. | 60.00 | 62.00 | 63.00 | 63.00 |
| Pour point, <°F. | −35.00 | −30.00 | −40.00 | −40.00 |

EXAMPLE II

A series of bottle tests were conducted with various crude oils to compare the effects of organic liquid A to EGMBE. Bottle tests are designed to evaluate products by providing qualitative information on wetting characteristics, emulsion characteristics, and cleaning of sand. Inventive liquid A was employed with 50 volume percent of aqueous 15 wt percent HCl, i.e. 50 volume percent A and 50 volume percent 15 wt percent HCl. EGMBE was employed with 90 volume percent of the 15 wt percent HCl.

The test procedure involved adding 25 ml of the selected crude oil and 25 ml of the selected solvent/acid mixture to 25 grams of sand in a prescription bottle. The resulting mixture was allowed to sit at room temperature 10 minutes and then observations were recorded on the condition of the oil/water interface, the glass, the sand, and the water phase according to the scale shown in the following table.

TABLE 4

| | 5 | 4 | 3 | 2 | 1 |
|---|---|---|---|---|---|
| Interface | Sharp | Defined but some texture at interface | Somewhat wavy | Emulsion layer present | Lack of distinct phases |
| Sand | White | Some | Partially | Oily | Black |
| Water | Clear | white spots Mostly clear | cleaned Clear with tiny oil droplets on glass | Murky | Dark |
| Glass | Cleaned | Mostly Clean Water Wet | Somewhat Clean Water wet | Oil wet with oil streaks | Oil wet Black |

After the initial observations were made the bottles were all shaken thoroughly in substantially the same manner and then allowed to sit 10 minutes and the observations of Table 4 were again recorded. The results for this last set of observations for various crude oils is shown in the following table.

TABLE 5

| | EGMBE | Liquid A |
|---|---|---|
| Strawn Crude (West Texas paraffinic) | | |
| Glass | 1 | 5 |
| Interface | 1 | 3 |
| Sand | 1 | 5 |
| Water | 2 | 3 |
| P9 Crude (North Sea paraffinic) | | |
| Glass | 1 | 4 |
| Interface | 3 | 3 |
| Sand | 2 | 3 |
| Water | 4 | 3 |
| Norway Crude (slightly paraffinic) | | |
| Glass | 2 | 2 |
| Interface | 2 | 2 |
| Sand | 1 | 3 |
| Water | 1 | 2 |
| Midland Crude (West Texas asphaltenic) | | |
| Glass | 2 | 2 |
| Interface | 1 | 3 |
| Sand | 1 | 2 |
| Water | 1 | 2 |
| Embar Crude (Rocky Mt. asphaltenic) | | |
| Glass | 1 | 5 |
| Interface | 1 | 4 |
| Sand | 1 | 1 |
| Water | 1 | 1 |

In all the crude oils the inventive liquid A showed some advantage over using EGMBE alone.

EXAMPLE III

Another series of bottle tests were carried out which compared the various inventive muticomponent liquids to EGMBE and two commercially available muticomponent liquids, i.e. liquids F and G. Various crude were tested, viz. SubClarksville East Texas asphaltenic; Hastings Gulf Coast low asphaltenic, low paraffinic; Midland Farms West Texas asphaltenic; Strawn West Texas paraffinic; Humphrey Sims Mid Continent asphaltenic; P9 North Sea paraffinic; Norway North Sea slightly paraffinic; and Embar Rocky Mountain asphaltenic.

The overall performance in the bottle tests was determined by adding up the total points obtained with each of the liquids after the liquids had been shaken and allowed to set. The point totals for each liquid were normalized relative to commercial liquid F. The results are shown in the following table.

TABLE 6

| Organic Liquid | Volume Percent* | Relative Performance |
|---|---|---|
| A | 50 | 8 |
| B | 50 | 6 |
| C | 35 | 11 |
| D | 35 & 15 | 7 |
| E (EGMBE) | 10 | 5 |
| F | 35 | 10 |
| G | 80 | 10 |

*Volume Percent as used in this and the following tables refers to Volume of the specified liquid/total volume of the organic liquid-aqueous acid mixture times 100.

The results show that the inventive liquids have application in a wide variety of crudes and on the whole produce better results than are obtained using EGMBE alone. Inventive organic liquid C was more effective than commercial liquid F in a variety of crudes. Inventive liquid A was almost as effective as the similar commercial liquid G. Inventive liquid A however had the added benefit of having a much higher flash point than liquid G.

EXAMPLE IV

In another series of tests the surface tension of the various liquid/acid mixtures was determined using a Fisher Surface Tensiomat and the duNouy Ring Method. Also the interfacial tension between the liquid/acid mixtures and $C_{10}$ and $C_{12}$ hydrocarbons was determined using the Tensiomat. The surface tension values and the interfacial tension values with $C_{12}$ hydrocarbons are summarized in the following table. (The difference between the interfacial tension values obtained for the $C_{10}$ and $C_{12}$ hydrocarbons was negligible, therefore only the latter is set forth in the following table.)

TABLE 7

| Liquid | Volume Percent | Surface Tension dynes/cm | Interfacial Tension dynes/cm |
|---|---|---|---|
| A | 50 | 26.3 | 4.0 |
| B | 35 | 25.9 | 3.1 |
| B | 50 | 25.8 | 3.1 |
| C | 25 | 25.5 | 4.1 |
| C | 35 | 25.5 | 4.5 |
| D | 15 | 25.5 | 2.9 |
| D | 35 | 26.8 | 2.5 |
| F | 35 | 24.8 | 2.9 |

The surface tension of the acidic solutions containing the inventive organic liquids were close to that of the commercial liquid F. The surface tension of EGMBE/acid mixtures at miscible proportions is known to be higher than those values. Accordingly, the inventive organic liquid provide a greater surface tension reduction that is obtained with EGMBE.

The interfacial tension values obtained with inventive liquids B and D were lower than or about the same as comparative liquid F. Inventive liquids A and C provide slightly higher interfacial tension values.

It is notable that liquid F is comparable to the liquid employed in Table 1 of U.S. Pat. No. 3,819,520. Therefore, if one compares the results set forth in the above table with those in Table 1 of that patent it is clear that the interfacial tension values obtained with the inventive liquids are lower than obtained when one uses EGMBE alone with the aqueous acid. It has already been noted by others that lowering interfacial tension is considered to contribute to greater effectiveness of acidizing fluids. Accordingly the organic liquids of this invention are considered likely to provide benefits that are not provided by using EGMBE alone in aqueous acid.

EXAMPLE V

A series of emulsion tendency tests were carried out according to API RP42 both with and without fines present. The fines employed were a 90/10 mixture of silica flour and bentonite. In the tests 15 wt percent aqueous HCl was combined with various volumes of the various organic liquids. The resulting organic liquid/aqueous acid mixtures were then mixed with an equal amount of crude oil and then the percent breakout recorded. The results are shown in the following tables.

TABLE 8

(MIDLAND FARMS CRUDE)

| | | | Percent Breakout | | |
|---|---|---|---|---|---|
| Liquid | Volume Percent | Fines | 5 min | 10 min | 20 min |
| A | 50 | yes | 72 | 80 | 84 |
|   | 50 | no | 18 | 44 | 58 |
| B | 50 | yes | 44 | 80 | 86 |
|   | 50 | no | 66 | 80 | 80 |
| C | 35 | yes | 66 | 86 | 88 |
|   | 35 | no | 86 | 86 | 86 |
| D | 35 | yes | 80 | 86 | 92 |
|   | 35 | no | 70 | 86 | 86 |
| E | 10 | yes | 0 | 0 | 0 |
|   | 10 | no | 10 | 10 | 10 |
| F | 35 | yes | 66 | 76 | 80 |
|   | 35 | no | 92 | 92 | 94 |
| G | 80 | yes | 93* | 89* | 78* |
|   | 80 | no | 30 | 76 | 76 |

*Only part of the solvent broke out, leaving a water/oil emulsion with the acid and oil.

TABLE 9

(P9 CRUDE)

| | | | Percent Breakout | | |
|---|---|---|---|---|---|
| Liquid | Volume Percent | Fines | 5 min | 10 min | 20 min |
| A | 50 | yes | 20 | 46 | 66 |
|   | 50 | no | 76 | 82 | 84 |
| B | 50 | yes | 32 | 60 | 70 |
|   | 50 | no | 34 | 80 | 84 |
| C | 35 | yes | 58 | 72 | 80 |
|   | 35 | no | 78 | 88 | 88 |
| D | 35 | yes | 84 | 96 | 98 |
|   | 35 | no | 100 | 100 | 100 |
| F | 35 | yes | 96 | 94 | 98 |
|   | 35 | no | 100 | 100 | 100 |
| G | 80 | yes | 68 | 88 | 98 |
|   | 80 | no | 92 | 96 | 96 |

TABLE 10

(NORWAY CRUDE)

| | | | Percent Breakout | | |
|---|---|---|---|---|---|
| Liquid | Volume Percent | Fines | 5 min | 10 min | 20 min |
| A | 50 | yes | 74 | 80 | 84 |
|   | 50 | no | 34 | 60 | 74 |
| B | 50 | yes | 74 | 80 | 81 |
|   | 50 | no | T* | 16 | 44 |
| C | 35 | yes | 54 | 82 | 90 |
|   | 35 | no | T | 10 | 42 |
| D | 35 | yes | 78 | 88 | 90 |
|   | 35 | no | 28 | 60 | 86 |
| E | 10 | yes | 40 | 60 | 76 |
|   | 10 | no | T | T | T |

*T denotes only a trace.

Table 8 shows that for the Midland Farm crude the solutions containing the $C_8$ alcohols all had better breakout results than when EGMBE was used without the $C_8$ alcohol, both in the presence and the absence of fines. Table 9 shows that for the P9 paraffinic crude substantial amounts of breakout occurred within reasonable time limits. The inventive liquids containing xylene, i.e. A and B showed somewhat slower breakout but were still within generally acceptable ranges. Table 10 shows that for the Norway crude the inventive liquids containing the $C_8$ alcohols on the whole gave better results than when EGMBE was used without the $C_8$ alcohol.

EXAMPLE VI

Another series of tests are conducted to compare the effectiveness of the various liquid/acid mixtures in penetrating a hydrocarbon coating and dissolving the acid soluble material of a stimulation pellet. The stimulation pellets employed were one inch diameter balls prepared of paraffinic crude and calcium carbonate paste. The tests involved dropping a stimulation pellet into 100 ml of the liquid/15% HCl mixture and then recording the time required for the dissolution of the pellet. The results are summarized in Table 11.

TABLE 11

| Liquid | Volume Percent | Time for Dissolution |
| --- | --- | --- |
| A | 50 | 24 hrs |
| B | 50 | 1 hr 15 min |
| B | 35 | 1 hr 5 min |
| C | 22 | 1 hr 25 min |
| C | 35 | 1 hr 5 min |
| D | 15 | 3 hrs |
| D | 35 | 45 min |
| E (EGMBE) | 10 | Did not dissolve |
| F | 35 | 24 hrs |
| G | 80 | 24 hrs |

The results clearly show that the mixtures containing the $C_8$ alcohols were more effective than the mixtures employing EGMBE without the $C_8$ alcohols. Further, the mixtures containing inventive liquids B, C, and D provided even better results than did the commercial liquids F and G.

EXAMPLE VII

In still another series of tests the effect of aqueous acidic mixtures of the organic liquids A-D and F on the corrosion of metal was evaluated. In each of the organic liquid/aqueous acid mixtures there was included a small amount of a conventional corrosion inhibitor of the type routinely used in acidizing formulations. The tests involved inserting N-80 metal coupons into each of the mixtures and then determining the amount of corrosion that had occurred after 6 hrs at 180° F. At equal loadings of inhibitor the acidic mixtures of inventive liquid A-D were slightly more corrosive than was the inhibited comparative liquid F. However even at 4 gpt (gallons of inhibitor/1000 gallons of acid mixture) the corrosion rates for A-D were only in the range of 0.017 to 0.025 lb/sq ft. Doubling the amount of inhibitor reduced that range to 0.0093 to 0.014 lb/sq ft.

While the present invention has now been described in some detail in regard to particular preferred embodiments and while some particular species have been specifically illustrated in the foregoing examples it should be clear that there are other and further modifications apart from those shown and described herein which may be made without departing from the spirit and scope of the claimed invention and its equivalents.

What is claimed is:

1. A high flash point multicomponent liquid consisting essentially of ethylene glycol monobutyl ether, hereinafter referred to as EGMBE, and octyl alcohol optionally in a mixture of $C_6$-$C_{10}$ alcohols, the liquid being substantially free of alcohols having less than six and more than ten carbon atoms in R of the formula of ROH, in proportions effective for having a flash point of at least about 100° F. and for forming a substantially clear single phase solution with aqueous acid comprising 5-30% by weight of acid selected from the group consisting of hydrochloric acid, formic acid, acetic acid, and hydrofluoric acid.

2. A multicomponent liquid according to claim 1 consisting essentially of EGMBE and the mixture of $C_6$-$C_{10}$ alcohols.

3. A liquid according to claim 2 containing about 76 weight percent EGMBE, and about 9 to about 11 weight percent octyl alcohol based upon the total weight of said multicomponent liquid.

4. A liquid according to claim 3 containing about 12 to about 14 weight percent $C_{10}$ alcohol based upon the total weight of said multicomponent liquid.

5. A solution comprising a multicomponent liquid according to claim 1 further comprising said aqueous acid wherein said multicomponent liquid comprises EGMBE in an amount of about 76 weight percent and octyl alcohol in an amount of about 9 to about 11 weight percent, said weight percents being based upon the total weight of said multicomponent liquid, and wherein said aqueous acid accounts for no more than about 75 volume percent of said solution.

6. A solution comprising a multicomponent liquid according to claim 5 wherein said multicomponent liquid further contains about 12 to about 14 weight percent $C_{10}$ alcohol based upon the total weight of said multicomponent liquid.

7. A multicomponent liquid according to claim 1 consisting essentially of EGMBE and the octyl alcohol.

8. A liquid according to claim 5 containing about 88 weight percent EGMBE and about 12 weight percent octyl alcohol based on the total weight of said multicomponent liquid.

9. A solution comprising a multicomponent liquid according to claim 8 further comprising said aqueous acid wherein said aqueous acid accounts for no more than about 85 volume percent of said solution.

10. A solution according to claim 9 wherein said aqueous acid accounts for about 85 weight percent of said solution.

11. A solution according to claim 9 wherein said aqueous acid accounts for about 65 weight percent of said solution.

12. A high flash point multicomponent liquid consisting essentially of ethylene glycol monobutyl ether, hereinafter referred to as EGMBE, and octyl alcohol optionally in a mixture of $C_6$-$C_{10}$ alcohols, and an organic liquid selected from the group consisting of benzene, toluene, xylene, and alkylated naphtha dissolved in kerosene, the liquid being substantially free of alcohols having less than six and more than ten carbon atoms in R of the formula of ROH, in proportions effective for having a flash point of at least about 100° F. and for forming a substantially clear single phase solution with aqueous acid comprising 5-30% by weight of acid selected from the group consisting of hydrochloric acid, formic acid, acetic acid, and hydrofluoric acid.

13. A liquid according to claim 12 containing about 70 weight percent EGMBE, about 10 weight percent octyl alcohol, and about 20 weight percent xylene said weight percents being based upon the total weight of said multicomponent liquid.

14. A solution comprising a multicomponent liquid according to claim 12 wherein said multipurpose liquid comprises EGMBE in an amount of about 70 weight percent of said liquid, octyl alcohol in an amount of about 10 weight percent of said liquid, and xylene in an amount of about 20 weight percent of said liquid, and further comprising said aqueous acid wherein said aqueous acid accounts for no more than about 50 volume percent of said solution.

15. A solution according to claim 14 wherein said aqueous acid accounts for about 50 volume percent of said solution.

16. A high flash point multicomponent liquid consisting of ethylene glycol monobutyl ether, hereinafter referred to as EGMBE, and octyl alcohol in an amount in the range of about 5 to about 20 percent by weight of the multicomponent liquid, optionally in a mixture of $C_6$–$C_{10}$ alcohols, and isopropyl alcohol up to about 10 weight percent based on the total weight of said multicomponent liquid, and an organic liquid selected from the group consisting of benzene, toluene, xylene, and alkylated naphtha dissolved in kerosene, in proportions effective for having a flash point of at least about 100° F. and for forming a substantially clear single phase solution with aqueous acid comprising 5–30% by weight of acid selected from the group consisting of hydrochloric acid, formic acid, acetic acid, and hydrofluoric acid, said multicomponent liquid being substantially free of surfactant.

17. A liquid according to claim 16 containing about 71 weight percent EGMBE, about 14 weight percent octyl alcohol, about 5 weight percent isopropyl alcohol, and about 10 weight percent xylene, said weight percents being based on the total weight of said multicomponent liquid.

18. A multicomponent liquid according to claim 16 comprising EGMBE in an amount in the range of about 65 to about 88 percent by weight of said multicomponent liquid.

19. A liquid according to claim 18 comprising about 9 to about 16 percent by weight of octyl alcohol based on the total weight of said multicomponent liquid.

20. A liquid according to claim 19 comprising about 70 to about 88 percent by weight EGMBE and about 9 to about 16 percent by weight of octyl alcohol, said weight percent being based on the total weight of said multicomponent liquid.

21. A liquid according to claim 20 containing up to about 20 weight percent xylene based upon the total weight of said multicomponent liquid.

22. An aqueous solution according to claim 16 further comprising said aqueous acid wherein said aqueous acid consists essentially of 15 weight percent HCl based upon the weight of said aqueous acid.

23. A solution according to claim 22 wherein said multicomponent liquid contains EGMBE in an amount of about 71 weight percent of said liquid, octyl alcohol in an amount of about 14 weight percent of said liquid, isopropyl alcohol in an amount of about 5 weight percent of said liquid, and xylene in an amount of about 10 weight percent of said liquid, and wherein said aqueous acid accounts for no more than about 65 volume percent of said solution.

24. A solution according to claim 23 wherein said aqueous acid accounts for about 65 volume percent of said solution.

25. A solution according to claim 24 wherein said aqueous acid accounts for about 50 volume percent of said solution.

* * * * *